United States Patent
Yeeles

(10) Patent No.: US 9,802,693 B2
(45) Date of Patent: Oct. 31, 2017

(54) CONTROL SURFACE CALIBRATION SYSTEM

(71) Applicant: The Boeing Company, Chicago, IL (US)

(72) Inventor: Christopher J. Yeeles, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 384 days.

(21) Appl. No.: 13/918,079

(22) Filed: Jun. 14, 2013

(65) Prior Publication Data

US 2014/0368637 A1 Dec. 18, 2014

(51) Int. Cl.
*B64C 13/00* (2006.01)
*G01C 21/04* (2006.01)
*G01B 21/04* (2006.01)

(52) U.S. Cl.
CPC ............ *B64C 13/00* (2013.01); *G01B 21/042* (2013.01); *G01C 21/04* (2013.01)

(58) Field of Classification Search
CPC .................................................. G01B 21/042
USPC ........................................................ 348/148
See application file for complete search history.

(56) References Cited

U.S. PATENT DOCUMENTS

| 5,182,505 A | 1/1993 | Miller | |
| 6,300,974 B1* | 10/2001 | Viala | G01V 8/10 348/61 |
| 2005/0172695 A1* | 8/2005 | Furze | G01B 21/042 73/1.01 |

FOREIGN PATENT DOCUMENTS

| DE | 10233153 A1 | 2/2004 |
| EP | 1901153 A1 | 3/2008 |
| WO | WO2012152809 A2 | 11/2012 |

OTHER PUBLICATIONS

Extended European Search Report, dated Jan. 29, 2015, regarding Application No. EP14172229.8, 5 pages.

(Continued)

*Primary Examiner* — Mikhail Itskovich
(74) *Attorney, Agent, or Firm* — Yee & Associates, P.C.

(57) ABSTRACT

A method and apparatus for calibrating a set of transducers. In one illustrative embodiment, an apparatus comprises a target device, an imaging device, and a calibrator. The imaging device generates a plurality of images of a target formed by the target device as the target device is rotated relative to the imaging device about a pivot axis formed at an interface between a first structure and a second structure in response to the first structure being rotated about the pivot axis relative to the second structure. The calibrator identifies a plurality of angles of the target about the pivot axis using the plurality of images. The calibrator further identifies calibration information using the plurality of angles.

17 Claims, 8 Drawing Sheets

(56) References Cited

OTHER PUBLICATIONS

Metroner, "SOLO Single Camera Electro-Optical Portable Coordinate Measurement System," 4 pages, accessed Jun. 14, 2013 http://boostreview.com/em/pdf/SOLO%20Brochure.pdf.
Canadian Intellectual Property Office Examination Search Report, dated Jun. 9, 2015, regarding Application No. 2,848,461, 3 pages.
Canadian Intellectual Property Office Examination Search Report, dated Mar. 31, 2016, regarding Application No. 2,848,461, 3 pages.
Intellectual Property Office of Taiwan Official Letter and Translation, dated Dec. 9, 2015, regarding Taiwan Patent Application No. 103119978, 11 pages.
Canadian Intellectual Property Office Examination Search Report, dated Feb. 6, 2017, regarding Application No. 2,848,461, pages.

\* cited by examiner

CONTROL SURFACE CALIBRATION SYSTEM

BACKGROUND INFORMATION

1. Field

The present disclosure relates generally to control surfaces and, in particular, to control surfaces associated with aircraft structures. Still more particularly, the present disclosure relates to a method and apparatus for calibrating the transducers used to measure the angle formed at the interface between a control surface and a structure of an aircraft.

2. Background

An aircraft may have any number of control surfaces. As used herein, a "control surface" may be a device or structure that provides reactive force when in motion relative to the surrounding air. A control surface, which may also be referred to as a flight control surface, may lift or control an aircraft during flight. Examples of control surfaces include, but are not limited to, flaps, ailerons, horizontal stabilizers, vertical stabilizers, and other types of control surfaces.

A control surface, such as a flap or aileron, may be attached to the trailing edge of the wing of an aircraft. For example, the control surface may be attached to the wing using one or more hinges to form a hinged interface between the control surface and the wing. The control surface may be rotated about the hinged interface to change the lift generated for the aircraft and/or the motion of the aircraft.

One or more transducers may be used to measure the rotation of the control surface about the hinged interface. As one illustrative example, transducers may be positioned at the hinges connecting the control surface to the wing. These transducers may include, for example, position sensors, rotation sensors, and/or other types of sensors.

Each transducer may generate output values indicating the angle of rotation of the control surface about the hinged interface. However, these output values may not be in desired angular units, such as degrees. The output values generated by a transducer may be converted into angle values in desired angular units based on tables and/or mathematical equations correlating to the output values of a transducer to reference angles in the desired angular units. These tables may be created by, for example, the manufacturer of the transducer. The angle values identified may be used to determine control law for the flight control system of the aircraft and/or to verify control laws.

However, in some cases, the angle value identified may be different from the actual angle of rotation of the control surface. This difference may be the result of, for example, without limitation, the manner in which the transducer was installed at the hinged interface. Consequently, the transducer may need to be calibrated after installation to ensure that the correct angle values are being identified.

Some currently available methods for calibrating these transducers may be more difficult and/or time-consuming than desired. These methods may include using, for example, without limitation, mechanical protractors, accelerometers, pendulum mechanisms, inclinometers, and/or other types of devices to identify the actual angle of rotation of the control surface. However, using these devices may provide results that are less accurate than desired and may be more time-consuming than desired. Therefore, it would be desirable to have a method and apparatus that take into account at least some of the issues discussed above, as well as other possible issues.

SUMMARY

In one illustrative embodiment, an apparatus comprises a target device, an imaging device, and a calibrator. The imaging device generates a plurality of images of a target formed by the target device as the target device is rotated relative to the imaging device about a pivot axis formed at an interface between a first structure and a second structure in response to the first structure being rotated about the pivot axis relative to the second structure. The calibrator identifies a plurality of angles of the target about the pivot axis using the plurality of images. The calibrator further identifies calibration information using the plurality of angles.

In another illustrative embodiment, a calibration system comprises a number of target devices, a number of imaging devices, a set of transducers, and a calibrator. An imaging device in the number of imaging devices generates a plurality of images of a target formed by a corresponding target device in the number of target devices as the corresponding target device is rotated relative to the imaging device about a pivot axis formed at the interface between a first structure and a second structure in response to the first structure being rotated about the pivot axis relative to the second structure. The set of transducers measure rotation of the first structure about the pivot axis relative to the second structure to generate output data. The calibrator identifies a plurality of angles about the pivot axis for the target using the plurality of images. The calibrator further identifies calibration information using the plurality of angles. The calibration information is used to convert the output data into angular data in desired angular units.

In yet another illustrative embodiment, a method for calibrating a set of transducers is provided. A plurality of images of a target formed by a target device is generated as the target device is rotated about a pivot axis formed at an interface between a first structure and a second structure in response to the first structure being rotated about the pivot axis relative to the second structure. A plurality of angles about the pivot axis is identified for the target using the plurality of images. Calibration information is identified using the plurality of angles.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a calibration system that reduces the time and effort needed to calibrate the transducers used for measuring the rotation of control surfaces. Further, the illustrative embodiments recognize and take into account that it may be desirable to have a calibration system that uses devices that can be removably attached to the control surfaces. In this manner, the devices used for calibrating the transducers may be removed from the aircraft while the aircraft is in flight. Thus, the weight of the aircraft and the aerodynamic performance may be substantially unaffected by the calibration system.

Figure 1:
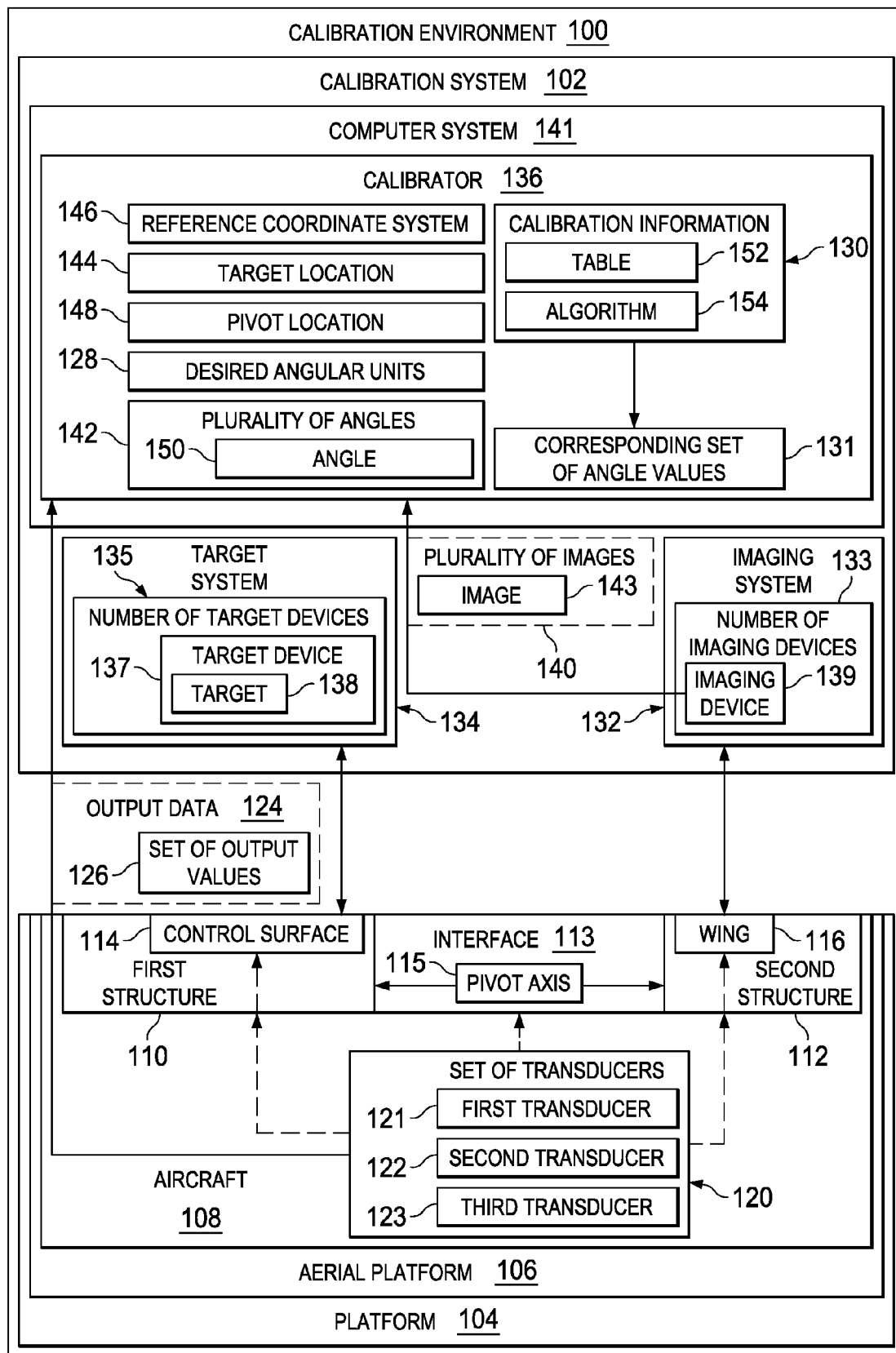
FIG. 1 is an illustration of a calibration environment in the form of a block diagram in accordance with an illustrative embodiment.

Referring now to the figures and, in particular, with reference to FIG. 1, an illustration of a calibration environment is depicted in the form of a block diagram in accordance with an illustrative embodiment. Within calibration environment 100 in FIG. 1, calibration system 102 may be used with platform 104. Platform 104 may take a number of different forms. In this illustrative example, platform 104 takes the form of aerial platform 106. Of course, in other illustrative examples, platform 104 may be a water-based platform, a space-based platform, or some other type of platform.

Further, aerial platform 106 may take a number of different forms. In this illustrative example, aerial platform 106 may take the form of aircraft 108. However, in other illustrative examples, aerial platform 106 may take the form of an unmanned aerial vehicle (UAV), a glider, or some other type of aerial platform.

As depicted, platform 104 may have first structure 110 associated with second structure 112. As used herein, when one component is "associated" with another component, the association is a physical association in the depicted examples. For example, a first component, such as first structure 110, may be considered to be associated with a second component, such as second structure 112, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

In this illustrative example, first structure 110 may be attached to second structure 112 through interface 113. Interface 113 may be implemented in a number of different ways. For example, without limitation, interface 113 may be implemented using any number of hinged joints, elastomeric elements, fasteners, bearing systems, and/or other types of components.

In this illustrative example, interface 113 between first structure 110 and second structure 112 may form pivot axis 115 about which first structure 110 may be rotated. In particular, first structure 110 may take the form of any object configured to rotate relative to second structure 112 about pivot axis 115 through interface 113.

In this illustrative example, with platform 104 taking the form of aircraft 108, first structure 110 may take the form of control surface 114 and second structure 112 may take the form of wing 116. Control surface 114 may be, for example, without limitation, a flap, an aileron, a stabilizer, or some other type of control surface. Of course, depending on the implementation, second structure 112 may take some other form such as, for example, without limitation, a tail section of aircraft 108 or some other type of second structure belonging to aircraft 108.

Control surface 114 is rotated about pivot axis 115 to change the angle of control surface 114 relative to wing 116. One position of control surface 114 relative to wing 116 may be used as a reference position in which the angle of control surface 114 about pivot axis 115 relative to wing 116 is known. This known angle may be about 0 degrees or some other angle, depending on the implementation.

The angle of control surface 114 relative to wing 116 may be changed using some type of actuation system or some other type of movement system, depending on the implementation. In some cases, the angle of control surface 114 relative to wing 116 may be changed using manual positioning of control surface 114.

In this illustrative example, set of transducers 120 may be used to measure the amount of rotation of control surface 114 about pivot axis 115. As used herein, a "set of" items may include one or more items. In this manner, set of transducers 120 may include one or more transducers. Set of transducers 120 may be located anywhere in and/or on aircraft 108 for use in measuring the amount of rotation of control surface 114 about pivot axis 115.

Set of transducers 120 may be associated with at least one of control surface 114, wing 116, interface 113, or some other type of structure associated with aircraft 108. As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In one illustrative example, set of transducers 120 may include first transducer 121 positioned at a first hinge connecting an inboard portion of control surface 114 to wing 116, second transducer 122 positioned at a second hinge connecting a middle portion of control surface 114 to wing 116, and third transducer 123 positioned at a third hinge connecting an outboard portion of control surface 114 to wing 116. The first hinge, second hinge, and third hinge may together form interface 113.

Set of transducers 120 may be configured to generate output data 124. Output data 124 may take the form of analog data or digital data, depending on the implementation of set of transducers 120. Output data 124 may be used to identify set of output values 126 for any given point in time. For example, when output data 124 is analog data, output data 124 may be converted into digital data to identify set of output values 126 for each sample time. When output data 124 is digital data, set of output values 126 may comprise set of output values 126 for each sample time.

Set of output values 126 may be a measure of the rotation of control surface 114 about pivot axis 115 at some given point in time. For example, the output value in set of output values 126 corresponding to first transducer 121 may measure the rotation of the inboard portion of control surface 114 about pivot axis 115. The output value in set of output values 126 corresponding to second transducer 122 may measure the rotation of the middle portion of control surface 114 about pivot axis 115. The output value in set of output values 126 corresponding to third transducer 123 may measure the rotation of the outboard portion of control surface 114 about pivot axis 115.

However, set of output values 126 may not be in desired angular units 128. Desired angular units 128 may be selected from one of degrees, radians, or some other type of angular unit. Consequently, set of output values 126 may need to be converted into angle values in the desired angular units.

Calibration system 102 may be used to generate calibration information 130 for use in calibrating set of transducers 120. Calibration information 130 may include information for converting output data 124 generated by set of transducers 120 into angular data in desired angular units 128. Further, in some cases, calibration information 130 may also include information for adjusting for errors in output data 124. In particular, calibration information 130 may be used to identify corresponding set of angle values 131 for each set of output values 126 generated by set of transducers 120. Each angle value in corresponding set of angle values 131 may be an angle of rotation about pivot axis 115 relative to wing 116 in desired angular units 128.

In one illustrative example, corresponding set of angle values 131 may include an angle for each output value in set of output values 126. In another illustrative example, corresponding set of angle values 131 may comprise one angle value for set of output values 126.

Calibration system 102 may be used when platform 104 is not in service. For example, when platform 104 takes the form of aircraft 108, calibration system 102 may be used when aircraft 108 is on the ground and not in flight.

Calibration system 102 may include imaging system 132, target system 134, and calibrator 136. Imaging system 132 may include number of imaging devices 133. Target system 134 may include number of target devices 135. As used herein, a "number of" items may include one or more items. In this manner, number of target devices 135 may include one or more target devices. Further, number of imaging devices 133 may include one or more imaging devices.

In one illustrative example, only one imaging device and only one target device may be needed. In another illustrative example, the actual number of imaging devices and target devices in number of imaging devices 133 and number of target devices 135, respectively, may be equal to the actual number of transducers in set of transducers 120. Further, number of imaging devices 133 and number of target devices 135 may include the same number of devices or different numbers of devices.

In one illustrative example, each of number of target devices 135 may provide a target for a corresponding imaging device in number of imaging devices 133. For example, target device 137 in number of target devices 135 may be used to provide target 138 for imaging device 139 in number of imaging devices 133.

In one illustrative example, target device 137 may be attached to control surface 114. Imaging device 139 may be attached to at least one of interface 113 and wing 116. Target device 137 and imaging device 139 may be positioned such that target 138 formed by target device 137 may be within the field of view of imaging device 139.

In one illustrative example, target device 137 may be a light pen and target 138 may be a beam of light formed by the light pen. In other illustrative examples, target device 137 may take the form of a laser device, an array of light emitting diodes (LEDs), a light source, an object having a marking of a particular color, or some other type of target device. Further, imaging device 139 may be a camera. The camera may be selected from one of a group consisting of an infrared camera, an electro-optical camera, an ultraviolet camera, or some other type of camera.

Calibrating set of transducers 120 may include rotating control surface 114 about pivot axis 115 for a selected period of time and/or through a selected range of angles. Imaging device 139 may generate plurality of images 140 as control surface 114 is rotated. Plurality of images 140 may capture target 138. When target 138 takes the form of a beam of light, target 138 may be captured as a point object within each image in plurality of images 140. In this manner, imaging device 139 generates plurality of images 140 of target 138 as control surface 114 is rotated about pivot axis 115.

Imaging device 139 may send plurality of images 140 to calibrator 136 for processing. Calibrator 136 may be implemented using hardware, software, or a combination of the two. In one illustrative example, calibrator 136 may be implemented using computer system 141. Computer system 141 may be comprised of one or more computers.

When more than one computer is present in computer system 141, these computers may be in communication with each other. Further, when more than one computer is present in computer system 141, these computers may be synchronized to some common clock. This type of synchronization may allow the times at which plurality of images 140 were generated to be matched to the times at which output data 124 is generated by set of transducers 120.

In one illustrative example, calibrator 136 may be implemented in a location remote to platform 104. Calibrator 136 may be used to control target system 134 and/or imaging system 132. Imaging system 132 may be configured to communicate with calibrator 136 using any number of wired communications links, wireless communications links, optical communications links, and/or other types of communications links. In some cases, calibrator 136 may be implemented within platform 104. For example, when platform 104 takes the form of aircraft 108, calibrator 136 may be implemented onboard aircraft 108 within a flight control system of aircraft 108.

Calibrator 136 may also be in communication with set of transducers 120. For example, calibrator 136 may be configured to receive output data 124 directly from set of transducers 120. In another example, calibrator 136 may be configured to receive output data 124 from a flight control system onboard aircraft 108. Of course, in other illustrative examples, calibrator 136 may receive output data 124 in some other manner. For example, calibrator 136 may receive output data 124 through some dedicated flight test system.

Calibrator 136 may use plurality of images 140 to identify plurality of angles 142 of target 138 about pivot axis 115. In particular, an angle of target 138 about pivot axis 115 may be identified for each image in plurality of images 140. Each angle in plurality of angles 142 may be an angle of rotation of target 138 about pivot axis 115 relative to wing 116.

For example, calibrator 136 first identifies a location for target 138 in image 143 in plurality of images 140 as target location 144 for image 143. Target location 144 may be identified with respect to reference coordinate system 146. Reference coordinate system 146 may be a coordinate system centered on imaging device 139.

Further, calibrator 136 may identify pivot location 148. Pivot location 148 may be the location at which pivot axis 115 intersects a plane that passes through both imaging device 139 and target device 137. This plane is substantially perpendicular to pivot axis 115. Further, the location of this plane along pivot axis 115 may be arbitrarily chosen.

Calibrator 136 uses target location 144 for image 143 and pivot location 148 to identify angle 150 of target 138 about pivot axis 115 for image 143. Using the method described above, calibrator 136 may identify plurality of angles 142 of target 138 for plurality of images 140.

Further, calibrator 136 may identify calibration information 130 using plurality of angles 142. In one illustrative example, calibration information 130 may comprise table 152 that identifies corresponding set of angle values 131 in desired angular units 128 for each set of output values 126 generated by set of transducers 120. Plurality of angles 142 may be used to identify corresponding set of angle values 131.

In one illustrative example, imaging device 139 may be the only imaging device in imaging system 132, while number of target devices 135 in target system 134 may include multiple target devices. In this example, plurality of images 140 may capture the targets formed by these multiple target devices. A plurality of angles may be identified for each of number of target devices 135 for plurality of images 140.

In this example, the angles identified for number of target devices 135 for a particular image, such as image 143, may be averaged to identify an overall angle value for the angle of rotation of control surface 114 about pivot axis 115 relative to wing 116. Set of transducers 120 may generate set of output values 126 at the time that image 143 was generated. The overall angle value identified may form corresponding set of angle values 131 for set of output values 126.

In another illustrative example, calibration information 130 may comprise algorithm 154 for converting any set of output values 126 generated by set of transducers 120 into corresponding set of angle values 131 in desired angular units 128. Algorithm 154 may comprise, for example, without limitation, at least one of a set of equations, a formula, a computational technique, an interpolation technique, or some other type of mathematical technique.

In this manner, calibrator 136 may correlate plurality of angles 142 with output data 124 to form calibration information 130. Once calibration information 130 has been generated, calibration information 130 may be sent to aircraft 108 for use during flight of aircraft 108. Target system 134 and imaging system 132 may then be removed from aircraft 108.

In one illustrative example, calibration information 130 may be used for generating input data for control laws used by the flight control system of aircraft 108 and/or for verifying these control laws. In some cases, calibration information 130 may be used to display corresponding set of angle values 131 to an operator, such as a flight test engineer, a flight test analysis engineer, a pilot, an on-ground flight engineer, a systems operator, or some type of other operator, during flight testing of aircraft 108 and/or flight of aircraft 108 while aircraft 108 is in service.

The illustration of calibration environment 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some illustrative examples, the actual number of imaging devices and target devices in number of imaging devices 133 and number of target devices 135 may be different from the number of transducers in set of transducers 120. For example, an imaging device in number of imaging devices 133 may be positioned between a pair of transducers in set of transducers 120. Further, in other illustrative examples, target device 137 may be configured for attachment to wing 116, while imaging device 139 may be configured for attachment to control surface 114.

Figure 2:
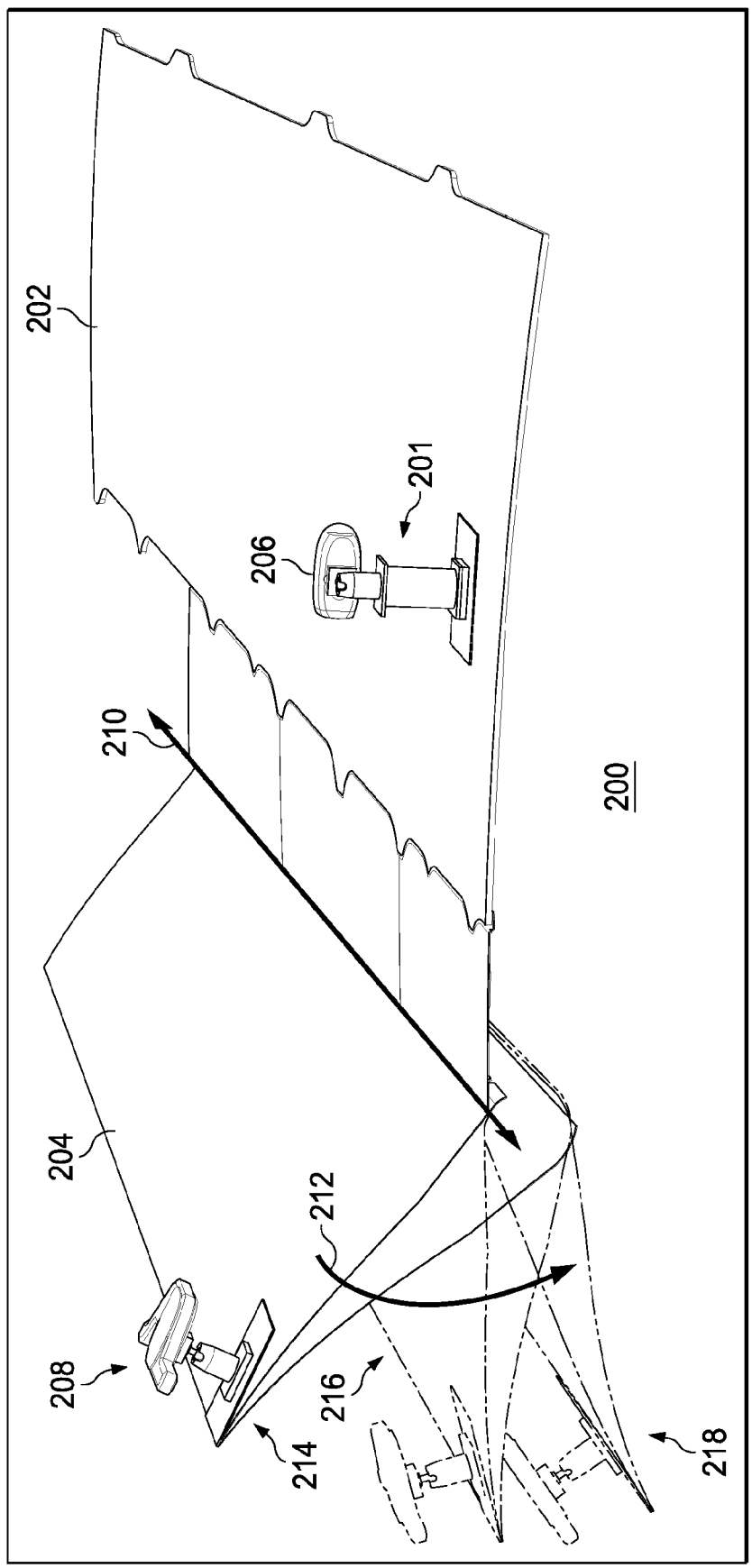
FIG. 2 is an illustration of a calibration environment in accordance with an illustrative embodiment.

With reference now to FIG. 2, an illustration of a calibration environment is depicted in accordance with an illustrative embodiment. In this illustrative example, calibration environment 200 is an example of one implementation for calibration environment 100 in FIG. 1. As depicted, calibration system 201 is present within calibration environment 200. Calibration system 201 may be an example of one implementation for calibration system 102 in FIG. 1.

Calibration system 201 may be used with wing 202 and control surface 204. Wing 202 and control surface 204 may be examples of implementations for wing 116 and control surface 114, respectively, in FIG. 1. Calibration system 201 may include imaging device 206 attached to wing 202 and target device 208 attached to control surface 204. Imaging device 206 and target device 208 may be examples of implementations for imaging device 139 and target device 137, respectively, in FIG. 1.

As depicted, control surface 204 may be rotated about pivot axis 210 in the direction of arrow 212. Control surface 204 may be rotated from first position 214 to second position 216, and then to third position 218. In some cases, second position 216 may be considered a reference position, or a default position, for which the angle of control surface 204 relative to wing 202 is known. While control surface 204 rotates, target device 208 attached to control surface 204 also rotates. Imaging device 206 may be configured to capture a target formed by target device 208 as control surface 204 rotates. In this illustrative example, the target formed by target device 208 may be a light beam.

Figure 3:
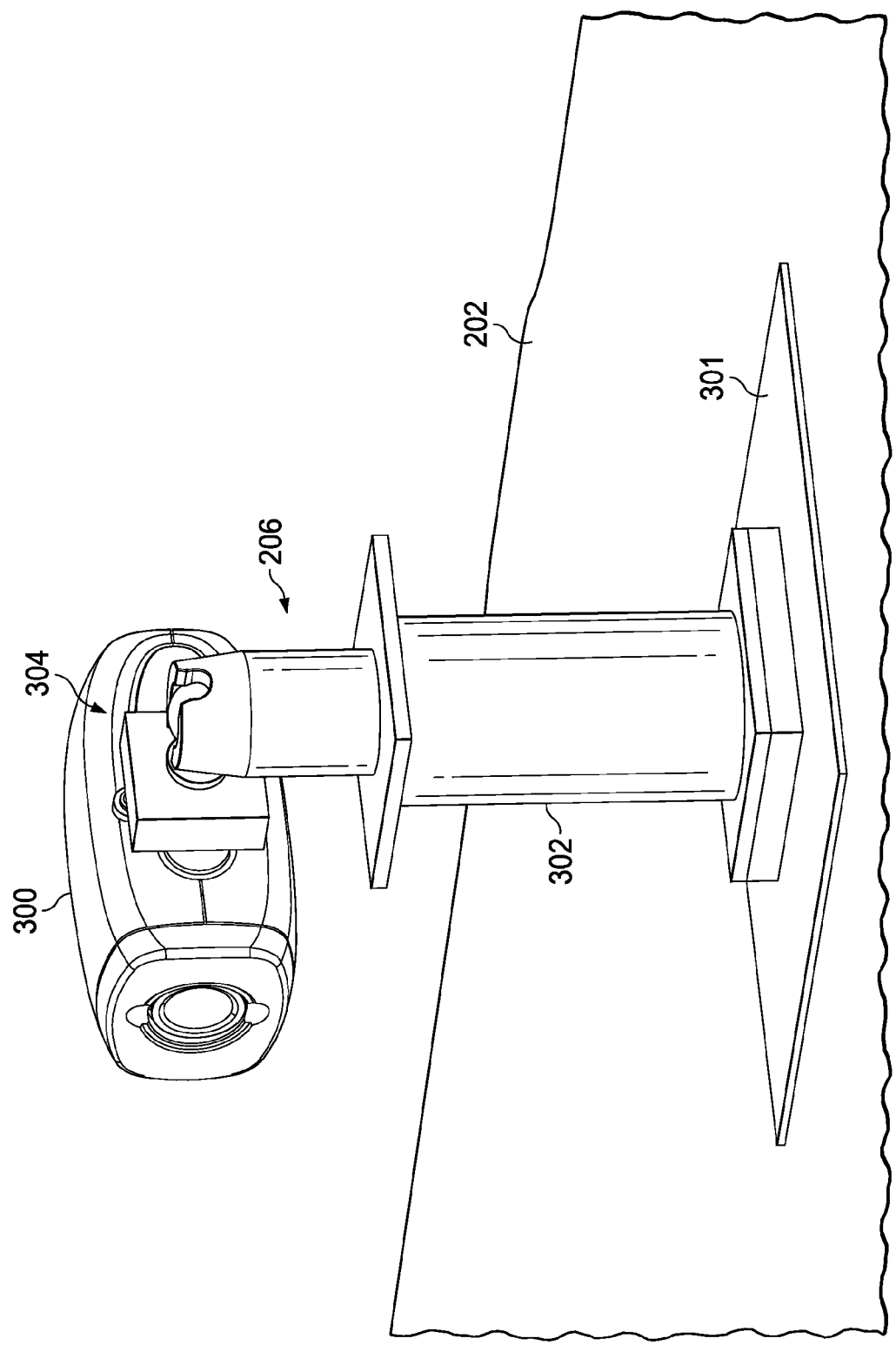
FIG. 3 is an illustration of an enlarged view of an imaging device in accordance with an illustrative embodiment.

With reference now to FIG. 3, an illustration of an enlarged view of imaging device 206 from FIG. 2 is depicted in accordance with an illustrative embodiment. In this illustrative example, imaging device 206 includes camera 300, attachment plate 301, structure 302, and positioning system 304.

Attachment plate 301 may be used to attach imaging device 206 to wing 202. Imaging device 206 is removably attached to wing 202. In other words, imaging device 206 may be detached from wing 202 and then reattached to wing 202 at some other point in time. The position along wing 202 at which imaging device 206 is attached may be arbitrarily selected. Any position may be selected in which target device 208 from FIG. 2 will be in the field of view of imaging device 206.

Structure 302 may be used to raise camera 300 above wing 202. Positioning system 304 may be used to change the position and/or orientation of camera 300 relative to structure 302. Camera 300 may be positioned and/or oriented such that the line of sight between imaging device 206 and target device 208 is unobstructed and such that target device 208 will be in focus.

Figure 4:
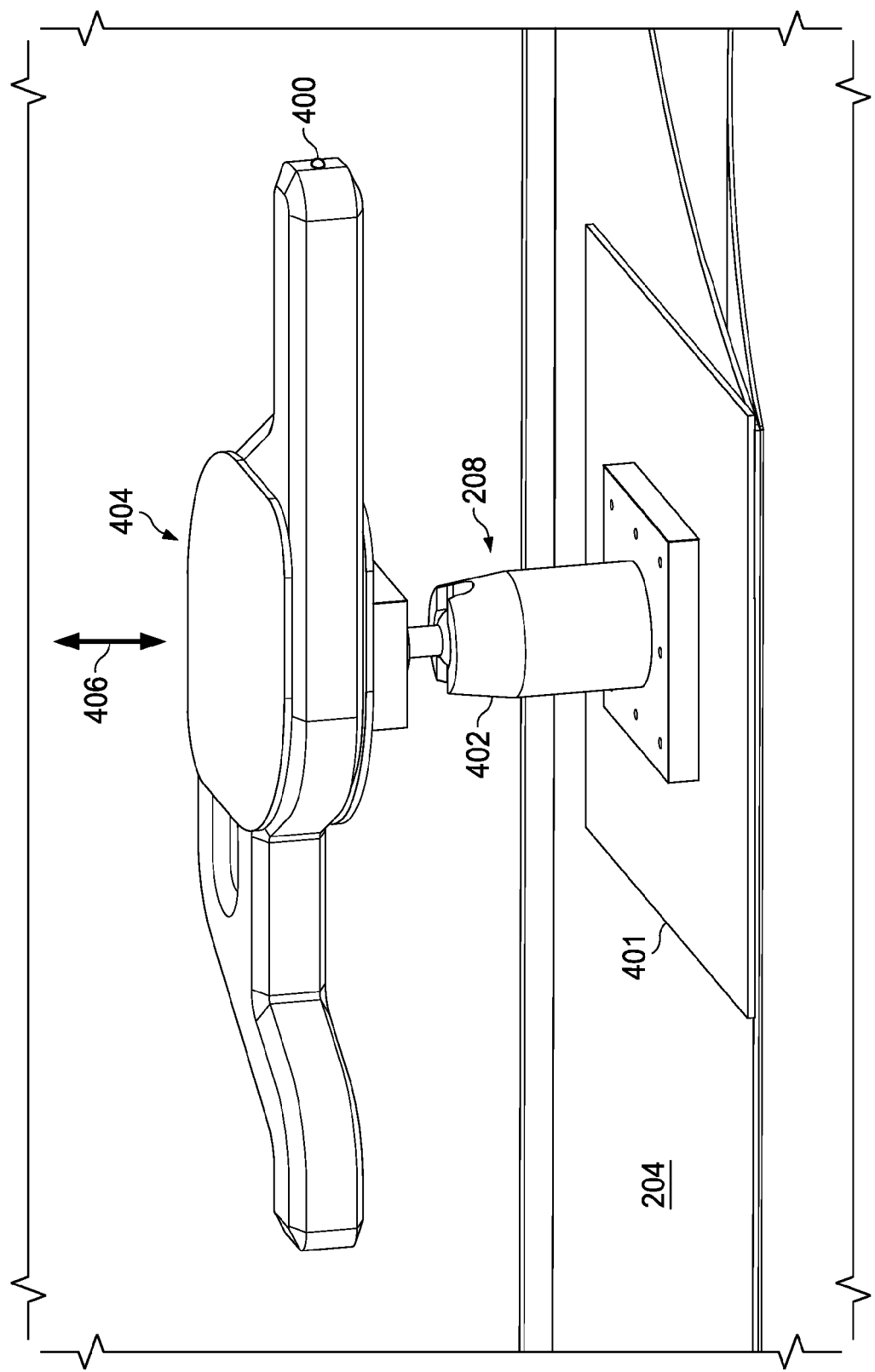
FIG. 4 is an illustration of an enlarged view of a target device in accordance with an illustrative embodiment.

Turning now to FIG. 4, an illustration of an enlarged view of target device 208 from FIG. 2 is depicted in accordance with an illustrative embodiment. In this illustrative example, target device 208 is shown from the trailing edge of control surface 204.

As depicted, target device 208 includes light generation device 400, attachment plate 401, structure 402, and positioning system 404.

Light generation device 400 may be used to generate a light beam that may be captured by camera 300 in FIG. 3 as a dot, or a point object. Attachment plate 401 may be used to attach target device 208 to control surface 204. Further, structure 402 may be used to raise light generation device 400 above control surface 204.

Positioning system 404 may be used to position light generation device 400 such that the light beam generated by light generation device 400 may be directed towards camera 300 from FIG. 3. In this illustrative example, positioning system 404 may be configured to rotate light generation device 400 about axis 406 through structure 402.

The illustrations of calibration environment 200 in FIG. 2, imaging device 206 in FIGS. 2-3, and target device 208 in FIG. 2 and FIG. 4 are not meant to imply physical or architectural limitations to the manner in which an illustrative embodiment may be implemented. Other components in addition to or in place of the ones illustrated may be used. Some components may be optional.

The different components shown in FIGS. 2-4 may be illustrative examples of how components shown in block form in FIG. 1 can be implemented as physical structures. Additionally, some of the components in FIGS. 2-4 may be combined with components in FIG. 1, used with components in FIG. 1, or a combination of the two.

Figure 5:
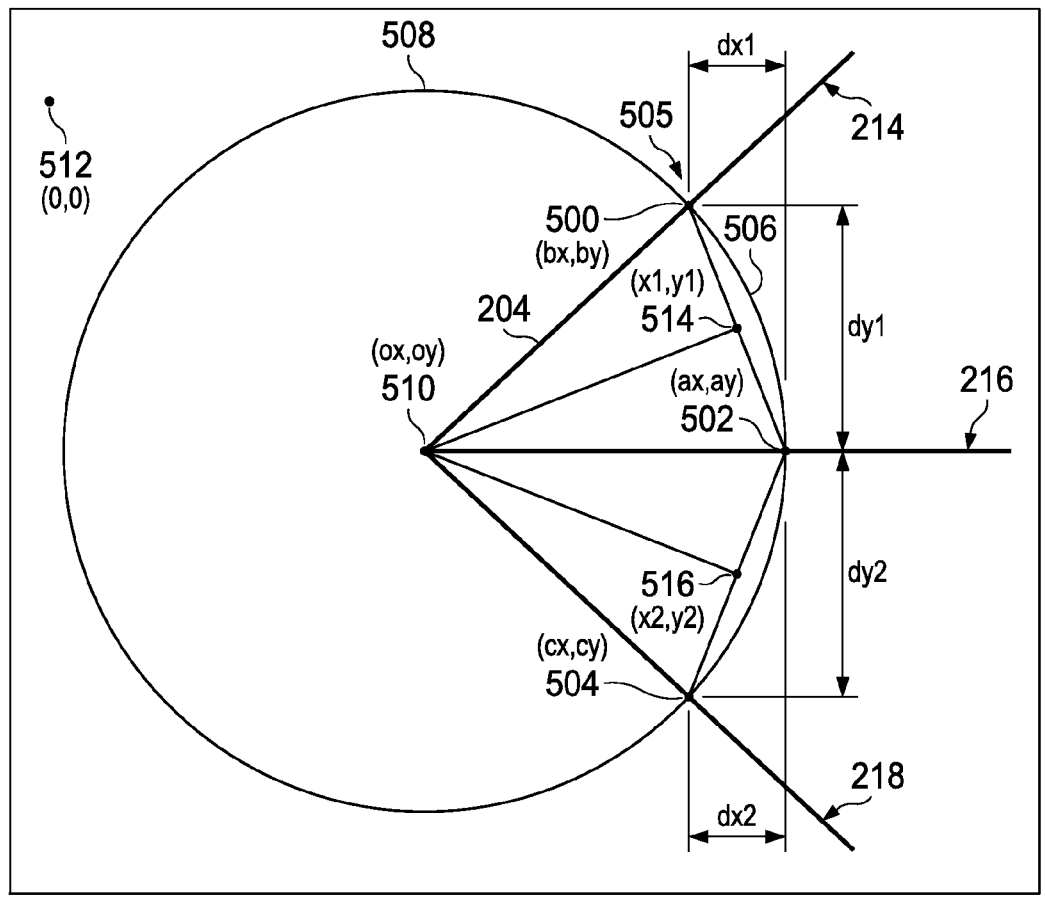
FIG. 5 is an illustration of a geometric representation of the movement of a control surface in accordance with an illustrative embodiment.

With reference now to FIG. 5, an illustration of a geometric representation of the movement of control surface 204 from FIG. 2 is depicted in accordance with an illustrative embodiment. Control surface 204 may be rotated from first position 214, to second position 216, and to third position 218.

As control surface 204 is rotated from first position 214, to second position 216, and then to third position 218, target 505 formed by target device 208 in FIG. 2 attached to control surface 204 may also be rotated from first position 500, to second position 502, and to third position 504, respectively. This rotation of target device 208 forms arc 506. Second position 502 may also be considered a reference position, or default position, for which the angle of control surface 204 relative to wing 202 is known.

Arc 506 may belong to circle 508, which may lie on a plane that is substantially perpendicular to pivot axis 210 in FIG. 2. Pivot point 510 represents the intersection of this plane with pivot axis 210 in FIG. 2. Pivot point 510 is the center of circle 508. Origin 512 represents the position of imaging device 206 in this illustrative example.

In this manner, arc 506 is in two dimensions in this illustrative example. For example, first position 500, second position 502, and third position 504 may be positions that can be described in three dimensions using an x-coordinate, a y-coordinate, and a z-coordinate. However, the z-coordinate may remain constant. These coordinates may be with respect to a camera-centric coordinate system having origin 512 as the origin of the camera-centric coordinate system.

Using arc 506, the radius between pivot point 510 and target 505 may be identified. This radius may be the radius of arc 506. Further, the coordinates for pivot point 510 relative to origin 512 may also be identified. A calibrator, such as calibrator 136 in FIG. 1, may use the images generated by camera 300 in FIG. 3 to determine the coordinates of first position 500, second position 502, and third position 504 of target 505. These coordinates may then be used to determine the radii described above.

The following equations may be used:

$$x1=(bx+ax)/2;$$

$$y1=(by+ay)/2;$$

$$dx1=bx-ax;$$

$$dy1=-(by-ay);$$

$$x2=(cx+bx)/2;$$

$$y2=(cy+by)/2;$$

$$dx2=cx-bx;$$

$$dy2=-(cy-by);$$

$$ox=(y1*dx1*dx2+x2*dx1*dy2-x1*dy1*dx2-y2*dx1*dx2)/(dx1*dy2-dy1*dx2);$$

$$oy=(ox-x1)*dy1/dx1+y1;$$

$$dx=ox-ax;$$

$$dy=oy-ay; \text{ and}$$

$$radius=\text{sqrt}((dx*dx)+(dy*dy))$$

where bx and by are the x and y coordinates of first position 500; ax and ay are the x and y coordinates of second position 502; cx and cy are the x and y coordinates of third position 504; x1 and y1 are the x and y coordinates of perpendicular bisector 514 of first position 500 and second position 502; x2 and y2 are the x and y coordinates of perpendicular bisector 516 of third position 504 and second position 502; dx1 is the difference between ax and bx; dy1 is the difference between ay and by; dx2 is the difference between cx and cx; dy2 is the difference between cy and by; ox and oy are the x and y coordinates for pivot point 510; dx is the difference between ox and ax; dy is the difference between oy and ay; and radius is the radius of arc 506.

The angle of target 505 may be identified using the angle of target 505 at second position 502. This angle may be known to be 0 degrees in this example. However, in other examples, this known angle may be some other angle. For example, the angle of target 505 at first position 500 may be identified as follows:

$$\text{angle}=a\sin((bx-ox)/\text{radius})*(180/\text{pi})$$

where angle is the angle of target 505 and pi is about 3.1415927.

Figure 6:
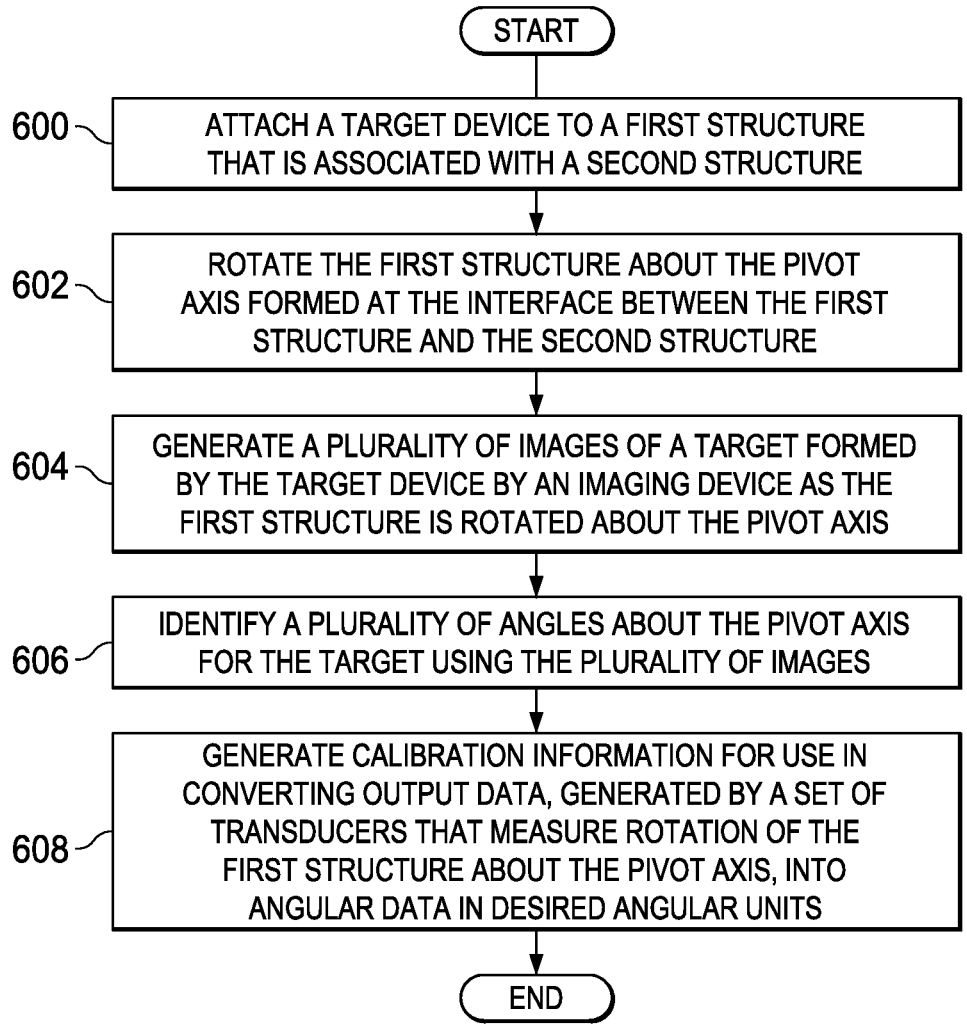
FIG. 6 is an illustration of a process for calibrating a set of transducers in the form of a flowchart in accordance with an illustrative embodiment.

With reference now to FIG. 6, an illustration of a process for calibrating a set of transducers is depicted in the form of a flowchart in accordance with an illustrative embodiment. The process may be implemented using calibration system 102 in FIG. 1.

The process begins by attaching a target device to a first structure that is associated with a second structure (operation 600). In operation 600, the first structure may be configured to rotate relative to the second structure. For example, the first structure may be attached to the second structure through an interface that forms a pivot axis. The first structure may be capable of rotating about this pivot axis relative to the second structure.

Next, the first structure may be rotated about the pivot axis formed at the interface between the first structure and the second structure (operation 602). A plurality of images of a target formed by the target device may be generated by an imaging device as the first structure is rotated about the pivot axis (operation 604).

Thereafter, a plurality of angles about the pivot axis for the target are identified using the plurality of images (operation 606). In particular, in operation 606, an angle of the target relative to the second structure may be identified for each image in the plurality of images using the location of the target with respect to a reference coordinate system in the image.

Next, calibration information for use in converting output data, generated by a set of transducers that measure rotation of the first structure about the pivot axis, is generated into angular data in desired angular units (operation 608), with the process terminating thereafter. The set of transducers may be associated with the first structure by being attached to at least one of the first structure, the second structure, and the interface between the first structure and the second structure. In particular, in operation 608, the calibration information may be used to calibrate the set of transducers such that a corresponding set of angle values for the first structure may be identified for any set of output values generated by the set of transducers.

In one illustrative example, the corresponding set of angle values may comprise a single angle value that indicates the angle of rotation of the first structure about the pivot axis relative to the second structure. In another illustrative example, the corresponding set of angle values may include an angle value for each of a number of different portions of the first structure in which each angle value indicates the angle of rotation of the corresponding portion of the first structure about the pivot axis relative to the second structure.

Figure 7:
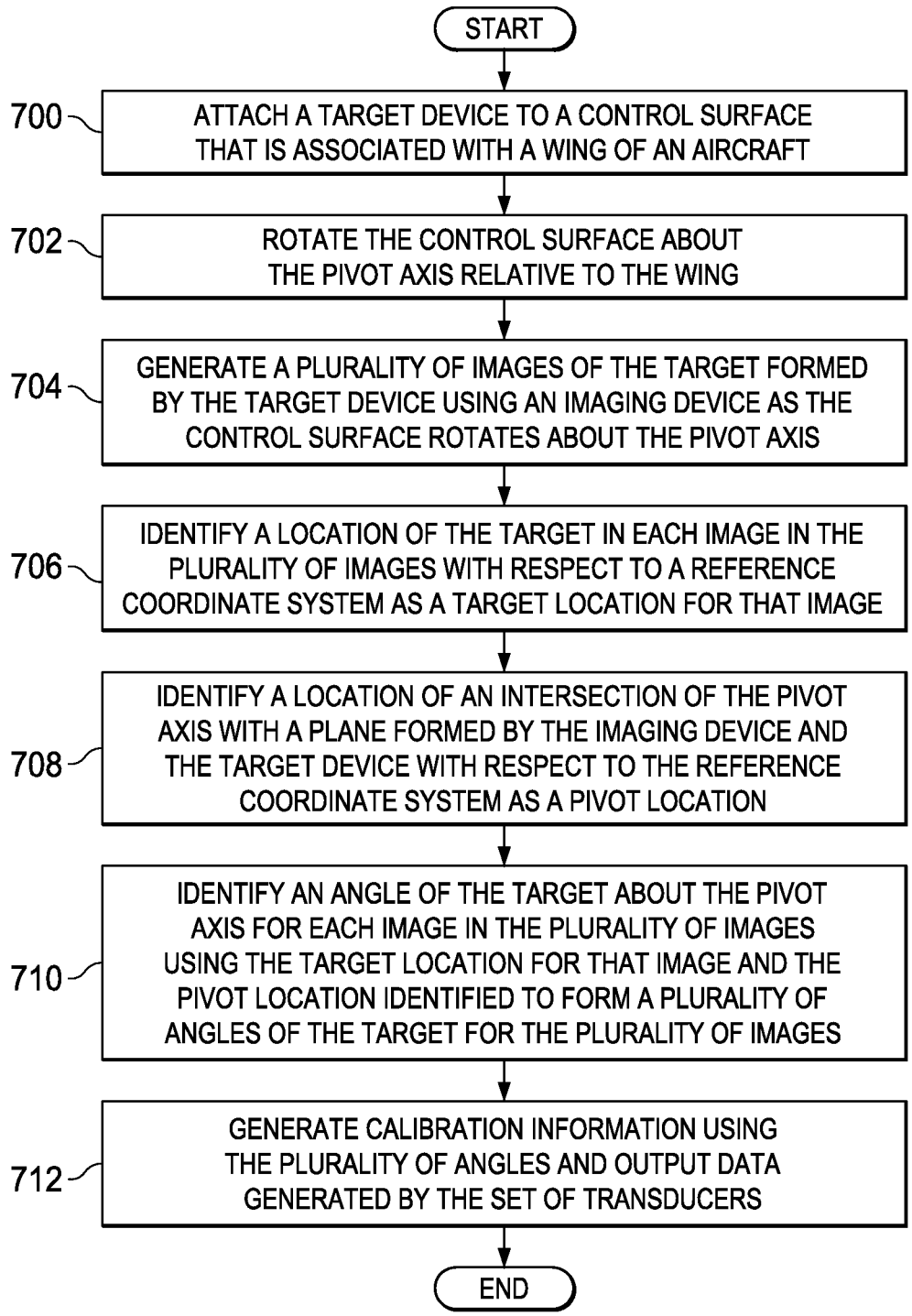
FIG. 7 is an illustration of a process for calibrating a set of transducers associated with a control surface in the form of a flowchart in accordance with an illustrative embodiment.

With reference now to FIG. 7, an illustration of a process for calibrating a set of transducers associated with a control surface is depicted in the form of a flowchart in accordance with an illustrative embodiment. The process described in FIG. 7 may be implemented using calibration system 102 in FIG. 1.

The process may begin by attaching a target device to a control surface that is associated with a wing of an aircraft (operation 700). In operation 700, the control surface may be configured to rotate about a pivot axis formed at the interface between the control surface and the wing. The target device may take the form of, for example, a light pen. The light pen may generate a light beam that forms a target.

Next, the control surface may be rotated about the pivot axis relative to the wing (operation 702). In operation 702, the control surface may be rotated about the pivot axis by a selected amount over a selected period of time. A plurality of images of the target formed by the target device may be generated using an imaging device as the control surface rotates about the pivot axis (operation 704). The imaging device may be attached to the wing or the interface between the control surface and the wing, depending on the implementation.

A location of the target in each image in the plurality of images with respect to a reference coordinate system may be identified as a target location for that image (operation 706). A location of an intersection of the pivot axis with a plane formed by the imaging device and the target device with respect to the reference coordinate system may be identified as a pivot location (operation 708).

Thereafter, an angle of the target about the pivot axis may be identified for each image in the plurality of images using the target location for that image and the pivot location identified to form a plurality of angles of the target for the plurality of images (operation 710). Next, the process generates calibration information using the plurality of angles and output data generated by the set of transducers (operation 712), with the process terminating thereafter.

Figure 8:
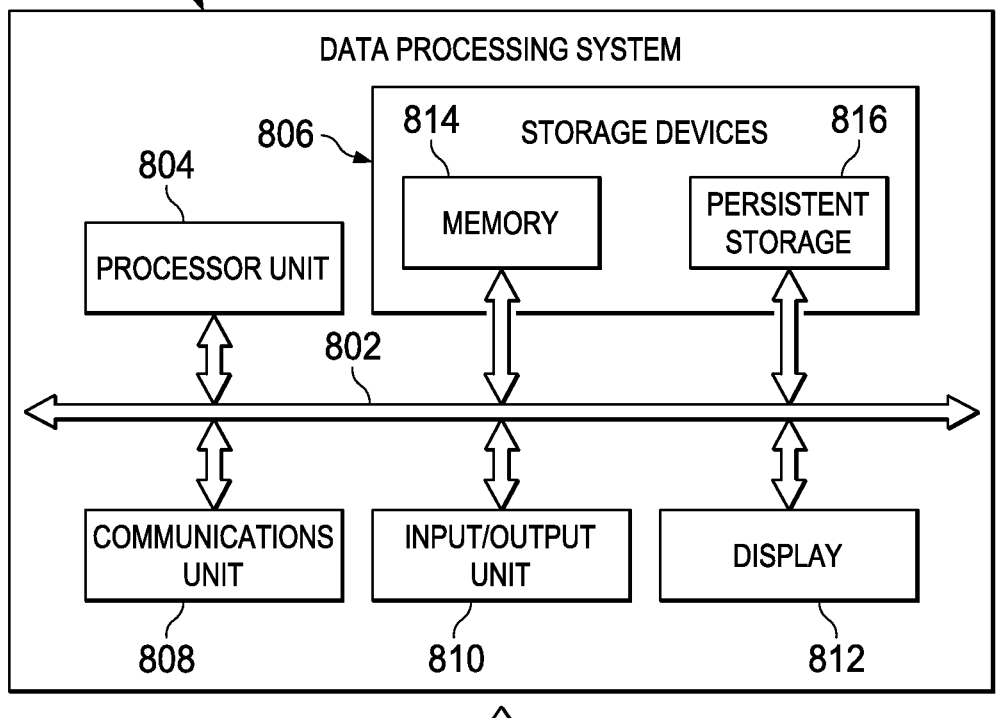
FIG. 8 is an illustration of a data processing system in the form of a block diagram in accordance with an illustrative embodiment.
Figure 8:
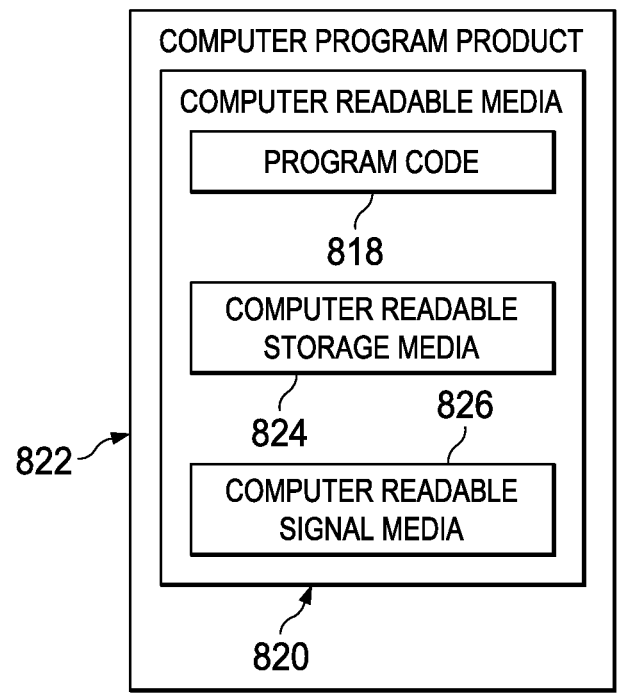

Turning now to FIG. 8, an illustration of a data processing system in the form of a block diagram is depicted in accordance with an illustrative embodiment. Data processing system 800 may be used to implement one or more computers in computer system 141 in FIG. 1. As depicted, data processing system 800 includes communications framework 802, which provides communications between processor unit 804, storage devices 806, communications unit 808, input/output unit 810, and display 812. In some cases, communications framework 802 may be implemented as a bus system.

Processor unit 804 is configured to execute instructions for software to perform a number of operations. Processor unit 804 may comprise a number of processors, a multi-processor core, and/or some other type of processor, depending on the implementation. In some cases, processor unit 804 may take the form of a hardware unit, such as a circuit system, an application specific integrated circuit (ASIC), a programmable logic device, or some other suitable type of hardware unit.

Instructions for the operating system, applications, and/or programs run by processor unit 804 may be located in storage devices 806. Storage devices 806 may be in communication with processor unit 804 through communications framework 802. As used herein, a storage device, also referred to as a computer readable storage device, is any piece of hardware capable of storing information on a temporary and/or permanent basis. This information may include, but is not limited to, data, program code, and/or other information.

Memory 814 and persistent storage 816 are examples of storage devices 806. Memory 814 may take the form of, for example, a random access memory or some type of volatile or non-volatile storage device. Persistent storage 816 may comprise any number of components or devices. For example, persistent storage 816 may comprise a hard drive, a flash memory, a rewritable optical disk, a rewritable magnetic tape, or some combination of the above. The media used by persistent storage 816 may or may not be removable.

Communications unit 808 allows data processing system 800 to communicate with other data processing systems and/or devices. Communications unit 808 may provide communications using physical and/or wireless communications links.

Input/output unit 810 allows input to be received from and output to be sent to other devices connected to data processing system 800. For example, input/output unit 810 may allow user input to be received through a keyboard, a mouse, and/or some other type of input device. As another example, input/output unit 810 may allow output to be sent to a printer connected to data processing system 800.

Display 812 is configured to display information to a user. Display 812 may comprise, for example, without limitation, a monitor, a touch screen, a laser display, a holographic display, a virtual display device, and/or some other type of display device.

In this illustrative example, the processes of the different illustrative embodiments may be performed by processor unit 804 using computer-implemented instructions. These instructions may be referred to as program code, computer usable program code, or computer readable program code and may be read and executed by one or more processors in processor unit 804.

In these examples, program code 818 is located in a functional form on computer readable media 820, which is selectively removable, and may be loaded onto or transferred to data processing system 800 for execution by processor unit 804. Program code 818 and computer readable media 820 together form computer program product 822. In this illustrative example, computer readable media 820 may be computer readable storage media 824 or computer readable signal media 826.

Computer readable storage media 824 is a physical or tangible storage device used to store program code 818 rather than a medium that propagates or transmits program code 818. Computer readable storage media 824 may be, for example, without limitation, an optical or magnetic disk or a persistent storage device that is connected to data processing system 800.

Alternatively, program code 818 may be transferred to data processing system 800 using computer readable signal media 826. Computer readable signal media 826 may be, for example, a propagated data signal containing program code 818. This data signal may be an electromagnetic signal, an optical signal, and/or some other type of signal that can be transmitted over physical and/or wireless communications links.

The illustration of data processing system 800 in FIG. 8 is not meant to provide architectural limitations to the manner in which the illustrative embodiments may be implemented. The different illustrative embodiments may be implemented in a data processing system that includes components in addition to or in place of those illustrated for data processing system 800. Further, components shown in FIG. 8 may be varied from the illustrative examples shown.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a target device attached to and positioned above a first structure generating a target that is directed towards an imaging device;
    an imaging device attached to and positioned above a second structure, the second structure rotatably connected to the first structure by a hinged interface along a pivot axis;
    a plurality of images generated by the imaging device as the first structure is rotated relative to the second structure about the pivot axis, each of the plurality of images including a point object formed by the target;
    a calibrator, implemented by a computer system connected to the imaging device, that identifies a location difference of the point object in the plurality of images, identifies a plurality of rotation angles of the target relative to the imaging device based on a location difference of the point object in the plurality of images, identifies calibration information using the plurality of rotation angles, and uses the calibration information to calibrate a set of transducers by converting output data into angular data in angular units, the output data generated by the set of transducers configured to measure an amount of rotation of the first structure about the pivot axis when the first structure is rotated about the pivot axis relative to the second structure;
    wherein the target device is a light pen or other means for generating a light beam that is attached to the first structure and the target is a beam of light generated by the light pen or the other means for generating the light beam.

2. The apparatus of claim 1, wherein the calibrator correlates the output data generated by the set of transducers with a corresponding one of the plurality of rotation angles.

3. The apparatus of claim 2, wherein the calibrator identifies a set of output values of the set of transducers using the output data in which an output value in the set of output values is a measure of the rotation of at least a portion of the first structure about the pivot axis, and wherein the calibrator generates a table that identifies a corresponding set of angle values in the desired angular units for each set of output values of the set of transducers.

4. The apparatus of claim 3, wherein the calibrator converts the set of output values generated by the set of transducers into the corresponding set of angle values in the desired angular units using an algorithm that takes into account the location difference of the point object in the plurality of images.

5. The apparatus of claim 2, wherein the set of transducers is associated with at least one of the first structure, the second structure, and the hinged interface between the first structure and the second structure.

6. The apparatus of claim 2, wherein the second structure is a wing of an aircraft and the first structure is a control surface moveably attached to the wing.

7. The apparatus of claim 1, wherein the beam of light is captured in the plurality of images as a point object and wherein the calibrator identifies a location of the point object in each image in the plurality of images with respect to a reference coordinate system as a target location.

8. The apparatus of claim 7, wherein the reference coordinate system is a coordinate system centered on the imaging device.

9. The apparatus of claim 1, wherein the imaging device is a camera attached to the second structure and wherein the camera is selected from one of a group consisting of an electro-optical camera, an infrared camera, and an ultraviolet camera.

10. The apparatus of claim 1, wherein the target device is removably attached to the first structure and the imaging device is removably attached to the second structure.

11. The apparatus of claim 1, wherein the target device is one of a number of target devices and wherein the imaging device is one of a number of imaging devices in which the number of target devices, the number of imaging devices, and the calibrator form a calibration system.

12. A calibration system comprising:
a number of target devices attached to and positioned above a control surface movably attached by a hinged interface to a wing of an aircraft, each generating a corresponding target that is directed towards a corresponding imaging device;
a number of imaging devices attached to and positioned above the wing of an aircraft;
a plurality of images generated by each of the number of imaging devices as the control surface is rotated relative to the wing about a pivot axis, each of the plurality of images including a point object formed by the corresponding target;
a set of transducers that generates output data as the control surface is rotated about the pivot axis relative to the wing of the aircraft; and
a calibrator, implemented by a computer system connected to the imaging device, that identifies a plurality of angles about the pivot axis for the target based on an average location difference of the point object in the plurality of images and identifies calibration information for rotation of the first structure about the pivot axis using the plurality of rotation angles in which the calibration information is used to convert the output data into angular data in desired angular units in order to calibrate the set of transducers;
wherein the number of target device are light pens or other means for generating a light beam that are attached to and above the control surface and the target is a beam of light generated by one of the light pens or one of the other means for generating the light beam.

13. A method for calibrating a set of transducers, the method comprising:
generating a beam of light by a light pen attached to and positioned above a control surface;
directing the light beam towards a camera attached to and positioned above the wing of the aircraft;
rotating the control surface relative to the wing of the aircraft about a pivot axis formed at a hinged interface between the control surface and the wing of the aircraft;
generating, by the imaging device, a plurality of images as the light pen is rotated relative to the imaging device in response to the control surface being rotated about the pivot axis relative to the wing of the aircraft, wherein the beam of light forms a point object in each of the plurality of images;
identifying, by a computer system connected to the imaging device, a plurality of rotation angles about the pivot axis for the beam of light based on a location difference of the point object in the plurality of images; and
identifying, by the computer system, calibration information for rotation of the control surface about the pivot axis using the plurality of rotation angles and using the calibration information to convert output data into angular data in angular units, the output data generated by the set of transducers configured to measure an amount of rotation of the control surface about the pivot axis when the control surface is rotated about the pivot axis relative to the wing of the aircraft; and
correlating, by the computer system, the output data with a corresponding one of the plurality of rotation angles identified from the plurality of images to calibrate the set of transducers.

14. The method of claim 13 further comprising:
identifying a set of output values of the set of transducers using the output data; and
wherein identifying the calibration information using the plurality of angles comprises:
generating a table that identifies a corresponding set of angle values in the desired angular units for each set of output values of the set of transducers.

15. The method of claim 13, wherein identifying the plurality of angles about the pivot axis for the beam of light using the plurality of images comprises:
identifying a location of the point object in each image in the plurality of images with respect to a reference coordinate system as a target location.

16. The method of claim 15, wherein identifying the plurality of angles about the pivot axis for the beam of light using the plurality of images further comprises:
identifying a location of an intersection of the pivot axis with a plane formed by the imaging device and the light pen with respect to the reference coordinate system as a pivot location of the target device relative to the imaging device.

17. The method of claim 16, wherein identifying the plurality of angles about the pivot axis for the target using the plurality of images further comprises:
identifying an angle about the pivot axis for the point object in an image in the plurality of images using the pivot location of the light pen relative to the imaging device and the location of the point object in the image;
wherein the imaging device is a camera.

* * * * *

UNITED STATES PATENT AND TRADEMARK OFFICE
CERTIFICATE OF CORRECTION

PATENT NO. : 9,802,693 B2
APPLICATION NO. : 13/918079
DATED : October 31, 2017
INVENTOR(S) : Christopher J. Yeeles Page 1 of 1

It is certified that error appears in the above-identified patent and that said Letters Patent is hereby corrected as shown below:

In the Claims

Column 14, Line 24, Claim 1 change "a" to --the--
Column 14, Line 48, Claim 3 delete "the" after "in"
Column 15, Line 24, Claim 12 change "an" to --the--
Column 15, Line 38, Claim 12 change "the" to --a--
Column 15, Line 43, Claim 12 change "device" to --devices--
Column 15, Line 53, Claim 13 change "the" first occurrence to --a--
Column 15, Line 53, Claim 13 change "the" second occurrence to --a--
Column 16, Line 1, Claim 13 change "the" to --an--

Signed and Sealed this
Twenty-seventh Day of February, 2018

Andrei Iancu
*Director of the United States Patent and Trademark Office*